(12) United States Patent
Bakke

(10) Patent No.: US 7,502,840 B1
(45) Date of Patent: Mar. 10, 2009

(54) SYSTEM AND METHOD FOR ASSIGNING MEDIA ADDRESSES TO MULTIPLE INTERNAL NODES

(75) Inventor: Mark A. Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 679 days.

(21) Appl. No.: 10/306,590

(22) Filed: Nov. 27, 2002

(51) Int. Cl.
G06F 15/177 (2006.01)

(52) U.S. Cl. ........................... 709/222; 709/220

(58) Field of Classification Search ................ 709/220, 709/222
See application file for complete search history.

(56) References Cited

U.S. PATENT DOCUMENTS

| | | | |
|---|---|---|---|
| 5,774,640 A * | 6/1998 | Kurio ............................ 714/4 |
| 6,490,292 B1 * | 12/2002 | Matsuzawa .................. 370/401 |
| 6,609,152 B1 * | 8/2003 | Ono ............................. 709/222 |
| 6,715,098 B2 * | 3/2004 | Chen et al. ..................... 714/3 |
| 6,928,478 B1 * | 8/2005 | Gangadharan ............... 709/226 |
| 6,947,398 B1 * | 9/2005 | Ahmed et al. ................ 370/331 |
| 6,977,939 B2 * | 12/2005 | Joy et al. ..................... 370/401 |
| 7,050,815 B2 * | 5/2006 | I'Anson et al. ........... 455/456.1 |

* cited by examiner

Primary Examiner—Ario Etienne
Assistant Examiner—Avi Gold
(74) Attorney, Agent, or Firm—Schwegman, Lundberg & Woessner, P.A.

(57) ABSTRACT

Systems and methods for assigning node MAC addresses for a plurality of internal and external network interfaces for a network device include determining a base address. The systems and methods assign a unique MAC address to ports using a base address that is unique to the network device. The base address can be either incremented, decremented or selected from a list to produce a unique MAC address for the next node requiring assignment, or it can be concatenated with other unique values to create a unique MAC address.

30 Claims, 5 Drawing Sheets

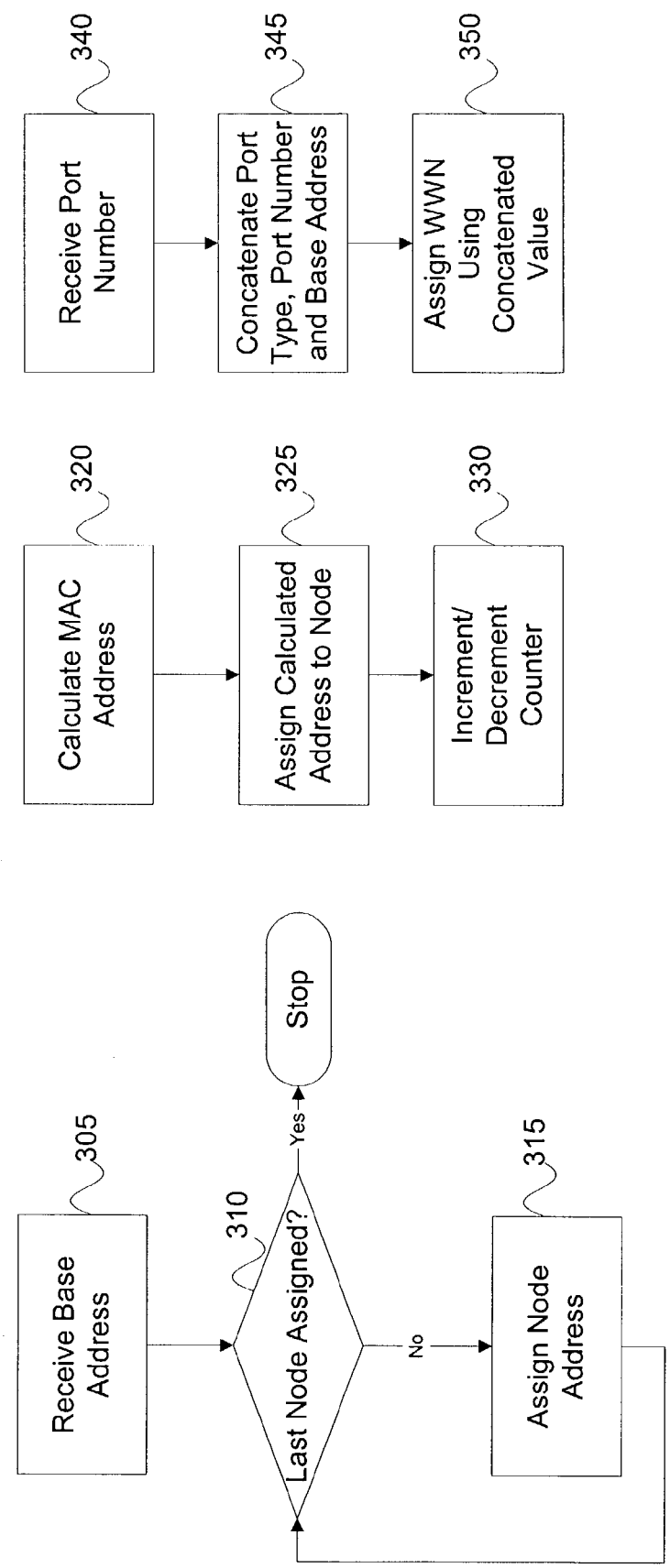

SYSTEM AND METHOD FOR ASSIGNING MEDIA ADDRESSES TO MULTIPLE INTERNAL NODES

FIELD

The present invention relates generally to network addressing, and more particularly to assigning unique MAC addresses to a plurality of internal nodes in a network module.

RELATED FILES

This invention is related to application Ser. No. 10/128,656, filed Apr. 22, 2002, now U.S. Pat. No. 7,165,258, issued Jan. 16, 2007, entitled "SCSI-BASED STORAGE AREA NETWORK", application Ser. No. 10/131,793, filed Apr. 22, 2002, now U.S. Pat. No. 7,281,062, issued Oct. 9, 2007, entitled "VIRTUAL SCSI BUS FOR SCSI-BASED STORAGE AREA NETWORK", and provisional application Ser. No. 60/374,921, filed Apr. 22, 2002, entitled "INTERNET PROTOCOL CONNECTED STORAGE AREA NETWORK", all of the above of which are hereby incorporated by reference.

BACKGROUND

The use of network attached devices continues to grow, and new types of network attached devices are constantly being developed. Typically, a network device will have one or more network interfaces, and each network interface must be uniquely identified in order for data packets to be delivered to the appropriate interface. For Ethernet networks, the unique identification comprises a MAC (Media Access Control) address. As is known in the art, MAC addresses are 48 bits in length and are typically expressed as 12 hexadecimal digits. The first 6 hexadecimal digits, which are administered by the IEEE (Institute of Electrical and Electronics Engineers), identify the manufacturer or vendor and thus comprise the Organizational Unique Identifier (OUI). The last 6 hexadecimal digits comprise the interface serial number.

For Fibre Channel networks, the unique identification comprises a WWN (World Wide Name) that can be further typed as a WWNN (World Wide Node Name) or a WWPN (World Wide Port Name).

In earlier network attached devices, there was typically a single interface to a network, so only one unique identifier was required. However, now it is common for network attached devices to have multiple network interfaces. Further, network attached devices can have both external network interfaces that attach to networks outside of the device and internal network interfaces that manage communications between nodes internal to the device. Each of the network interfaces require a unique identifier.

In previous systems, these unique network interface identifiers were burned into a ROM (Read Only Memory) at the time the interface was manufactured. Newer devices provide a means for dynamically assigning network interface identifiers such as MAC addresses and WWNs. However, these systems do not provide a mechanism for automatically assigning unique network interface identifiers to each of a plurality of network nodes internal to the device. As a result, there is a need in the art for the present invention.

SUMMARY

The above-mentioned shortcomings, disadvantages and problems are addressed by the present invention, which will be understood by reading and studying the following specification.

In one aspect of the invention, a method for assigning node MAC addresses for a plurality of internal and external network interfaces for a network device includes determining a base address. In the case of a node requiring a unique MAC address, the base address can be either incremented, or a maximum address can be decremented to produce a unique MAC address for the next node requiring assignment. The determination to increment from a base address or decrement from a maximum address may be based on the type of network interface to be assigned a MAC address. In the case of a WWN, the base MAC address can be concatenated with other unique values to create a unique WWN.

The present invention describes systems, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIG. 3A is a flowchart illustrating a method of assigning a node address to the internal nodes of a network device according to an embodiment of the invention;

FIG. 3B is a flowchart illustrating a method of assigning a MAC address to an internal Ethernet node of a network device according to an embodiment of the invention;

FIG. 3C is a flowchart illustrating a method of assigning a World Wide Name (WWN) to the internal SCSI port of a network device according to an embodiment of the invention;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
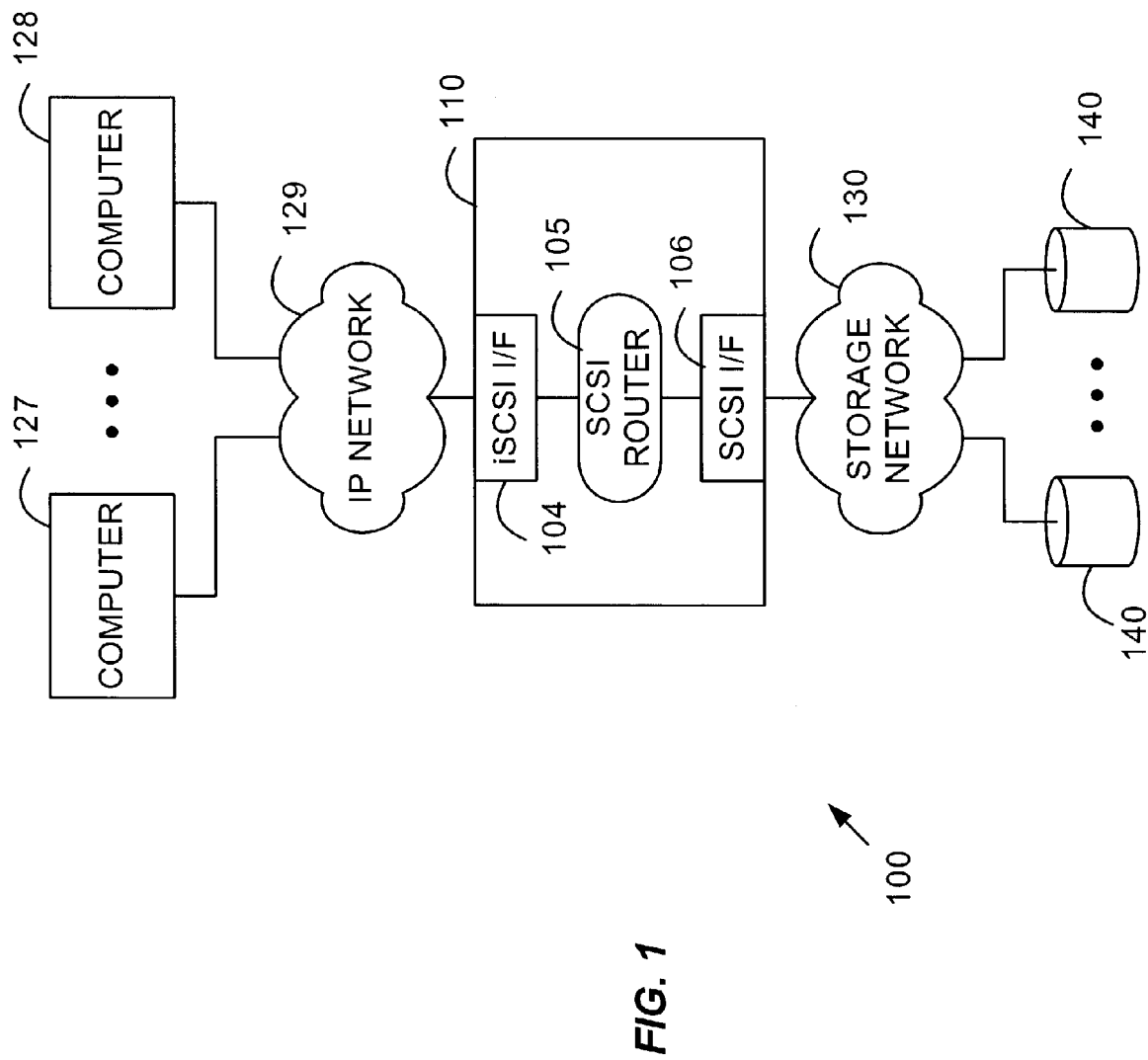
FIG. 1 is a block diagram of a storage router hardware and operating environment in which different embodiments of the invention can be practiced.

Some embodiments of the invention operate in an environment of systems and methods that provide a means for Fibre Channel based Storage Area Networks (SANs) to be accessed from TCP/IP network hosts. FIG. 1 is a block diagram describing the major components of such a system. Storage router system 100 includes computers (127, 128) connected through an IP network 129 to storage router 110. Storage router 110 is connected in turn through storage network 130 to one or more SCSI devices 140. In the embodiment shown in FIG. 1, storage router 110 includes an iSCSI interface 104, a SCSI router 105 and a SCSI interface 106. iSCSI interface 104 receives encapsulated SCSI packets from IP network 129, extracts the SCSI packet and send the SCSI packet to SCSI router 105. SCSI interface 106 modifies the SCSI packet to conform to its network protocol (e.g., Fibre Channel, parallel SCSI, or iSCSI) and places the modified SCSI packet onto storage network 130. The SCSI packet is then delivered to its designated SCSI device 140.

In one embodiment, storage router 110 provides IPv4 router functionality between a Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called logical target) is an arbitrary name for a group of physical storage devices. Mappings between an iSCSI target to multiple physical devices can be established using configuration programs on storage router 110. An iSCSI target always contains at least one Logical Unit Number (LUN). Each LUN on an iSCSI target is mapped to a single LUN on a physical storage target.

Figure 2:
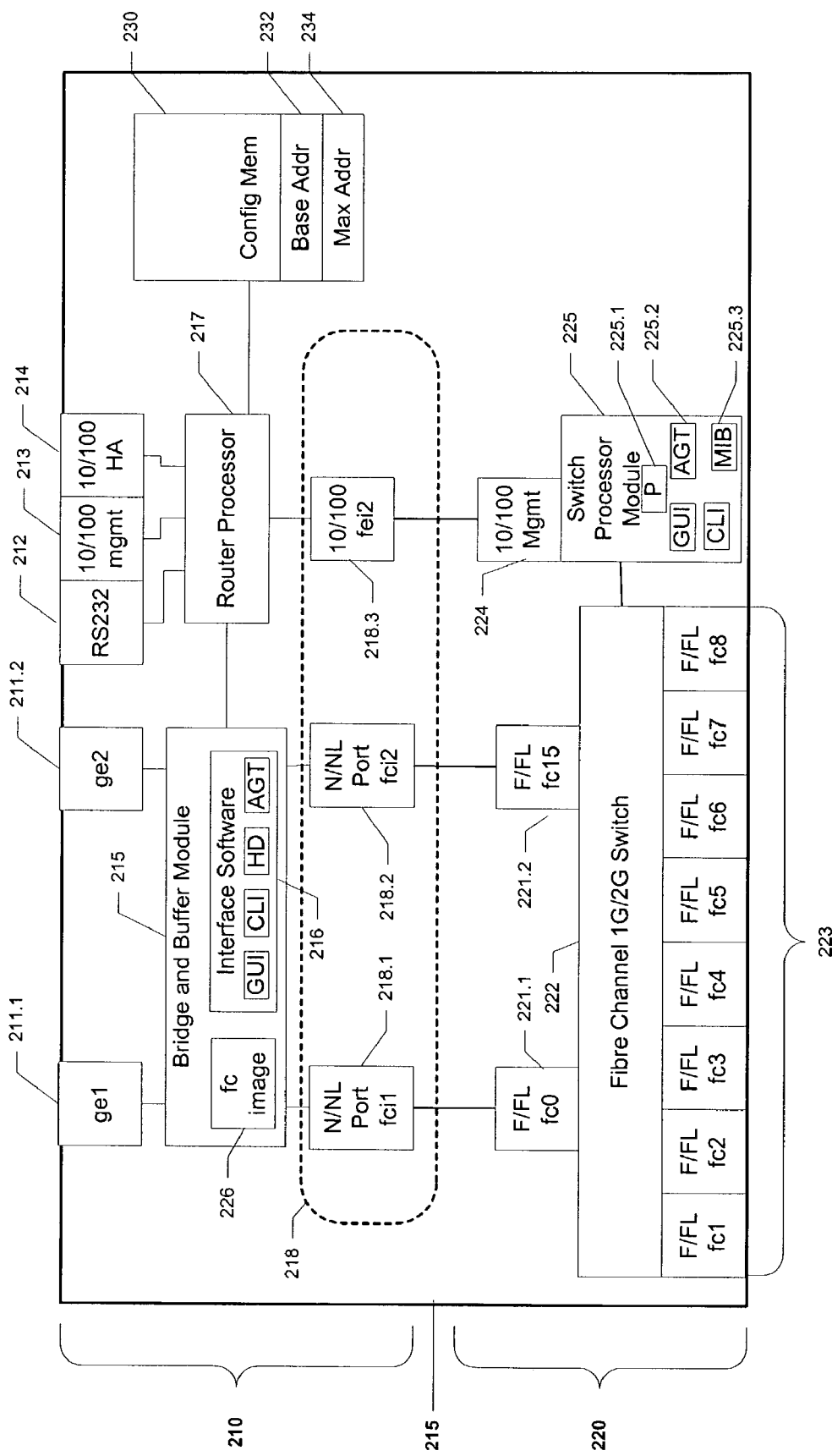
FIG. 2 is a block diagram of the major hardware components of a storage router according to an embodiment of the invention.

FIG. 2 is a block diagram providing further details of the major hardware components comprising storage router 110. In some embodiments, storage router 110 includes a router portion 210 and a switch portion 220 on a common motherboard 215. The motherboard is powered by a power supply (not shown) and cooled by common cooling system, such as a fan (also not shown).

Router portion 210, which in the exemplary embodiment complies with draft 08 and later versions of the iSCSI protocol and incorporates commercially available router technology, such as the 5420 and 5428 Storage Routers from Cisco Systems, Inc. of San Jose, Calif., includes Gigabit Ethernet (GE) ports 211.1 and 211.2, console port 212, management port 213, high-availability (HA) port 214, bridge-and-buffer module 215, interface software 216, router processor 217, and router-to-switch interface 218.

GE ports 211.1 and 211.2 couple the storage router to an IP network for access by one or more servers or other computers, such as servers or iSCSI hosts (in FIG. 1). In some embodiments, GE ports 211.1 and 211.2 have respective MAC addresses, which are determined according to a base MAC address for the storage router plus 31 minus the respective port number. Two or more Gigabit Ethernet interfaces may be available. Each SCSI router supports a single IP address. The SCSI router IP address may be tied to any network or Virtual Local Area Network (VLAN) on either GE interface. If both GE interfaces are to be used, at least two SCSI routers must be created.

Console port 212 couples to a local control console (not shown). In the exemplary embodiment, this port takes the form of an RS-232 interface.

Management port 213 provides a connection for managing and/or configuring storage router 110. In the exemplary embodiment, this port takes the form of a 10/100 Ethernet port and may be assigned the base MAC address for the router-switch.

HA port 214 provides a physical connection for high-availability communication with another router-switch, such as storage router 110 in FIG. 1. In the exemplary embodiment, this port takes the form of a 10/100 Ethernet port, and is assigned the base MAC address plus 1.

Bridge-and-buffer module 215, which is coupled to GE ports 211.1 and 211.2, provides router services that are compliant with draft 08 and later versions of the iSCSI protocol. In the exemplary embodiment, module 215 incorporates a Peripheral Component Interface (PCI) bridge, such as the GT64260 from Marvell Technology Group, LTD. of Sunnyvale, Calif. Also module 215 includes a 64-megabyte flash file system, a 1-megabyte boot flash, and a 256-megabyte non-volatile FLASH memory (not shown separately.) Configuration memory 230 may be part of the flash file system, the boot flash or the non-volatile flash memory, or it may be a separate non-volatile flash memory. In addition, in alternative embodiments, configuration memory 230 may be part of a hard disk, CD-ROM, DVD-ROM or other persistent memory (not shown). The invention is not limited to any particular type of memory for configuration memory 230.

Configuration memory 230 includes a base address 232 and a maximum address 234 that define a lower and upper range of unique network interface (node) identifiers. In some embodiments of the invention, the base address 232 and maximum address 234 are both MAC addresses. In alternative embodiments of the invention, base address 232 is a MAC address and maximum address 234 is a value added to the base address 232 to calculate the upper allowable address. In further alternative embodiments, base address 232 and maximum address 234 are defined in an array or list of assignable MAC addresses. In some embodiments, the base address and maximum address are assigned by the manufacturer after the device is assembled. The Manufacturer assures that no two devices are assigned the same base MAC address, and that there is no overlap between the base address and maximum address for any two devices.

In addition to data and other software used for conventional router operations, module 215 includes router-switch interface software 216. Router-switch software 216 performs iSCSI routing between servers and the storage devices. The software includes an integrated router-switch command line interface module CLI and a web-based graphical-user-interface module (GUI) for operation, configuration and administration, maintenance, and support of the router-switch 110. Both the command-line interface and the graphical user interface are accessible from a terminal via one or both of the ports 213 and 214. Additionally, to facilitate management activities, interface software 216 includes an SNMP router-management agent AGT and an MIB router handler HD. (SNMP denotes the Simple Network Management Protocol, and MIB denotes Management Information Base (MIB)). The agent and handler cooperate with counterparts in switch portion 220 (as detailed below) to provide integrated management and control of router and switching functions in router-switch 200.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas (such as areas where log and configuration files are written.

Coupled to router processor 217 as well as to bridge-and-buffer module 215 is router-to-switch (RTS) interface 218. RTS interface 218 includes N/NL switch-interface ports 218.1 and 218.2 and management-interface port 218.3, where the port type of N or NL is determined by negotiation. N type ports may act as a Fibre Channel point to point port, NL type ports may negotiate as a loop.

Switch-interface ports 218.1 and 218.2 are internal Fibre Channel (FC) interfaces through which the router portion conducts I/O operations with the switch portion. When a mapping to a FC storage device is created, the router-switch software automatically selects one of the switch-interface ports to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, switch-interface ports 218.1 and 218.2 are hidden from the user. One exception is the WWPN of each internal port. The internal WWPNs are called "initiator" WWPNs. Users who set up access control by WWPN on their FC devices set up the device to allow access to both initiator WWPNs.

Switch-interface port 218.3 is used to exchange configuration data and get operational information from switch portion 220 through its management-interface port 224. In the exemplary embodiment, switch-interface port 218.3 is an 10/100 Ethernet port. In the exemplary embodiment, this exchange occurs under the control of a Switch Management Language (SML) Application Program Interface (API) that is part of interface software 216. One example of a suitable API is available from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223.1-223.8, a management interface port 224, and a switch processor module 225.

FC interface ports 221.1 221.2 are coupled respectively to ports of 218.1 and 218.2 of the router-to-switch interface via internal optical fiber links, thereby forming internal FC links. In the exemplary embodiment, each FC interface supports auto-negotiation as either an F or FL port.

FC switch 222, in the exemplary embodiment, incorporates a SANbox2-16 FC switch from QLogic Corporation. This SANbox2 switch includes QLogic's Itasca switch ASIC (application-specific integrated circuit.) Among other things, this switch supports Extended Link Service (ELS) frames that contain manufacturer information.

FC ports 223.1-223.8, which adhere to one or more FC standards or other desirable communications protocols, can be connected as point-to-point links, in a loop or to a switch. For flow control, the exemplary embodiment implements a Fibre Channel standard that uses a look-ahead, sliding-window scheme, which provides a guaranteed delivery capability. In this scheme, the ports output data in frames that are limited to 2148 bytes in length, with each frame having a header and a checksum. A set of related frames for one operation is called a sequence.

Moreover, the FC ports are auto-discovering and self-configuring and provide 2-Gbps full-duplex, auto-detection for compatibility with 1-Gbps devices. For each external FC port, the exemplary embodiment also supports: Arbitrated Loop (AL) Fairness; Interface enable/disable; Linkspeed settable to 1 Gbps, 2 Gbps, or Auto; Multi-Frame Sequence bundling; Private (Translated) Loop mode.

Switch processor module 225 operates the FC switch and includes a switch processor (or controller) 225.1, and associated memory which includes a switch management agent 225.2, and a switch MIB handler 225.3. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Further details on the operation of the above describe system, including high availability embodiments can be found in application Ser. No. 10/128,656, entitled "SCSI-BASED STORAGE AREA NETWORK", application Ser. No. 10/131,793, entitled "VIRTUAL SCSI BUS FOR SCSI-BASED STORAGE AREA NETWORK", and provisional application Ser. No. 60/374,921, entitled "INTERNET PROTOCOL CONNECTED STORAGE AREA NETWORK", all of which have been previously incorporated by reference.

FIGS. 3A-3C are flowcharts illustrating methods according to embodiments of the invention for assigning a node address to the internal and external nodes of a network device such as a storage router. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIGS. 3A-3C are inclusive of acts that may be taken by an operating environment executing an exemplary embodiment of the invention.

A system desiring to assign a plurality of node addresses begins by receiving a base address that is to be used during the assignment of the node addresses (block 305). In some embodiments, the base address is a MAC address. The base address in some embodiments is read from a configuration memory (memory 230, FIG. 2).

Next, the system proceeds to assign a node address to each node requiring a unique node identifier. In some embodiments, an internal discovery process is executed in order to determine the nodes requiring node identifiers. In alternative embodiments, configuration data is used to determine which nodes require node identifiers. In further alternative embodiments, a combination of internal discovery and configuration is used to determine the nodes requiring a node identifier. The system checks to see if the last node requiring a node address has been assigned one (block 310). If so, the method terminates. Otherwise, the method proceeds to assign a node address to the next node requiring one (block 315).

FIG. 3B is a flowchart providing further details on assigning a node address when the node is an Ethernet node such as gigabit Ethernet ports 211, 10/100 Ethernet management port 213, 10/100 Ethernet high availability port 214 or internal 10/100 ports 218.3 and 224. The address assignment method begins by calculating a MAC address for the node (block 320). In some embodiments, the MAC address is calculated by adding a counter value to the base address. The counter value may be a value indicating the number of previously assigned node addresses that is added to the base address. Alternatively, the counter may be a value indicating the number of previously assigned node addresses that is subtracted from the maximum address. In some embodiments of the invention, addresses calculated for the GE ports 211 start from the maximum address and count down, and addresses assigned to other Ethernet nodes in the device start at the base address and count up. In this case, two separate counters may be required.

It is desirable to employ both counting up from a base address and counting down from a maximum address, because doing so provides added flexibility in the numbers and types of ports that can be provided by the system. In some embodiments of the invention, two basic types of Ethernet ports are present, one set of ports provides for the communication of iSCSI data to and from the device, while the other set of ports are used for management purposes. By assigning the two types of ports in a different manner, a designer can adjust the number of each type of ports without having an adverse affect on the configuration and design of the other type of port.

In some embodiments, the base MAC address is assigned to the 10/100 management port 213, and other Ethernet ports are assigned MAC addresses as calculated using the counters.

Next, the calculated MAC address is then assigned to the node (block 325). The appropriate counter is then adjusted so that the next assignment will be unique to the device (block 330). It should be noted that the counter can be incremented prior to, or after calculation of the MAC address. All that is required is for the counter to be incremented in a manner that generates a unique MAC address.

Figure 4A:
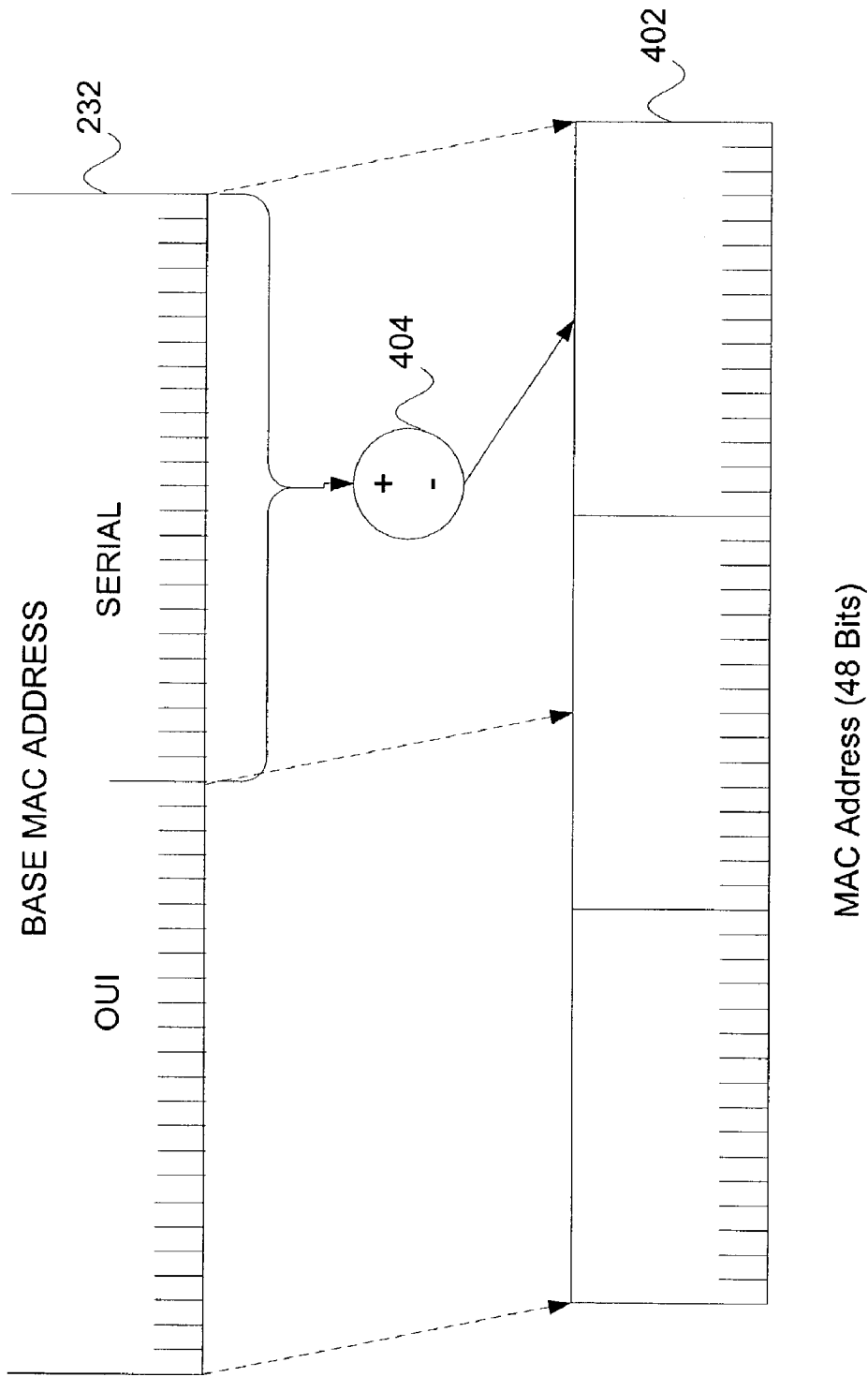
FIG. 4A is a pictorial diagram illustrating the operation of the methods described in FIGS. 3A-3C for an embodiment of the invention where the node requires an Ethernet MAC address.

FIG. 4A provides a pictorial representation of the method described above in FIG. 3B. Node MAC address 402 is determined by performing an operation on base MAC address 232, including the OUI portion and serial number portion. As described above, the operation may be an increment or decrement operation 404 on a counter that is added to or subtracted from the serial portion of the base MAC address.

Figure 4B:
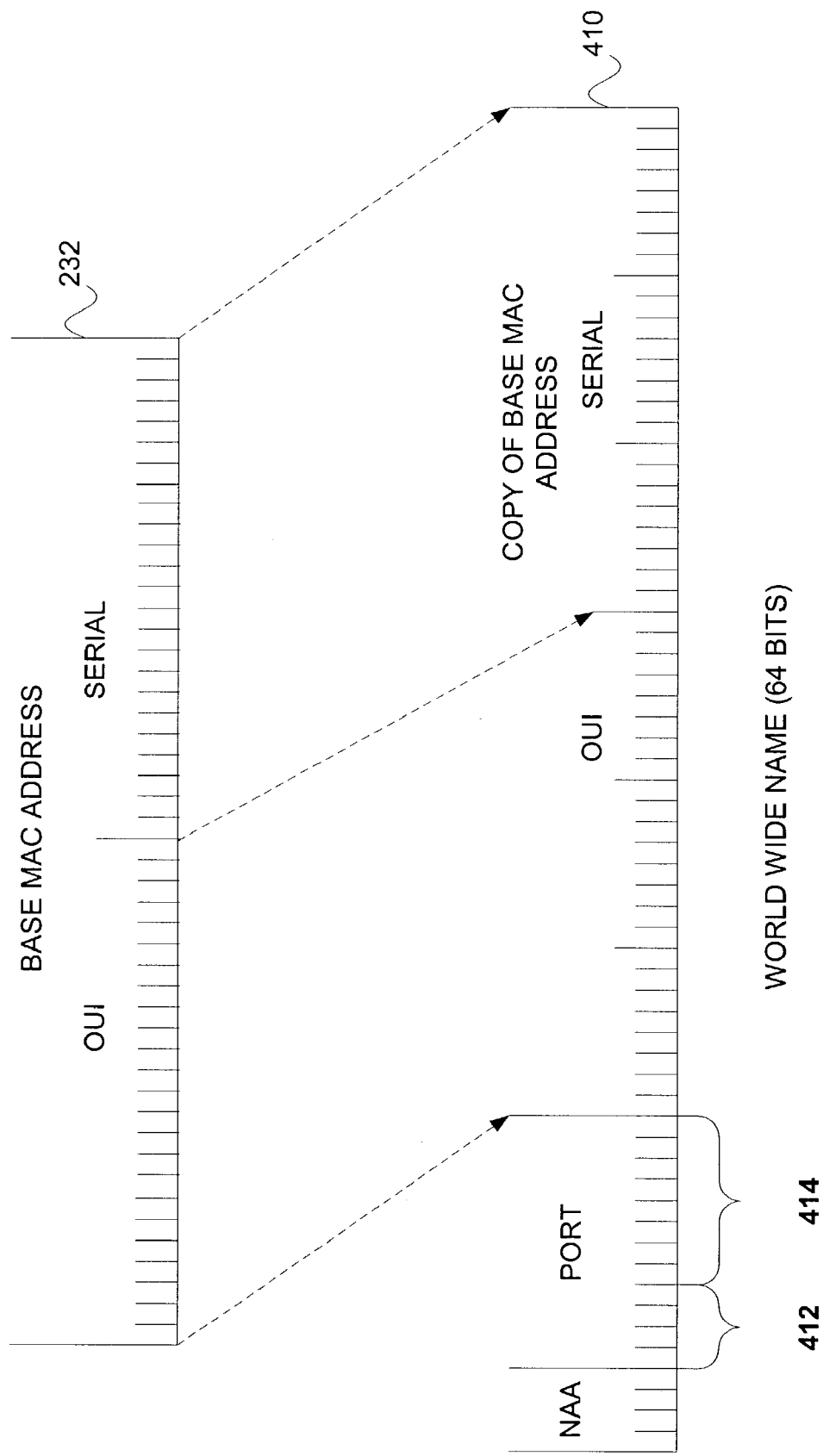
FIG. 4B is a pictorial diagram illustrating the operation of the methods described in FIGS. 3A-3C for an embodiment of the invention where the node requires a WWN node address.

FIG. 3C is a flowchart providing further details on assigning a node address, such as a WWPN as illustrated in FIG. 4B, when the node is a Fibre Channel port, such as ports 221, 222, 223 and 218. In some embodiments of the invention, the WWPN for such ports comprises a logical concatenation of several values, including the base MAC address. For the purposes of this specification, logical concatenation indicates an operation resulting in a particular bit pattern when read from left to right or right to left. The invention is not limited to any particular order of bit assignment, and values may be assigned in any order.

In some embodiments of the invention, the NAA (Network Address Authority) value of the calculated WWPN is set to 2, indicating that the address is an IEEE (Institute of Electrical and Electronics Engineers) extended WWPN address. While using an IEEE extended WWPN address is desirable, the invention is not limited to such addresses, and other types of WWPN addresses can be used as will be appreciated by those of skill in the art. In some embodiments, a system executing the method then determines the port type and port number to be assigned (block 340). The port type is a value determined according to the type of port for which an address is being calculated. For example, in the case of FC interface ports 221 and external FC ports 223, a port type of 0 is used for port type 412 (FIG. 4B) in some embodiments. Further, in some embodiments of the invention, ports 218.1 and 218.2 have the ability to support up to 32 virtual ports. In these embodiments, a port type of 8 is assigned to port type 412 for port 218.1 and a port type of 9 is assigned port type 412 for port 218.2. The virtual port number is then assigned to port number 414 (FIG. 4B) for ports 218.1 and 218.2. Thus the WWPNs for the internal FC ports in some embodiments of the invention are as follows:

| | |
|---|---|
| External FC ports: | 2 # 0 # port number # base MAC address |
| Internal Switch Ports: | " |
| First Internal N/NL port: | 2 # 8 # virtual port number # base MAC address |
| Second Internal N/NL port | 2 # 9 # virtual port number # base MAC address |

Where the # operator indicates logical concatenation. Finally, the base MAC address 232 is used to determine the remaining bit values. As is known in the art, the OUI portion of the MAC address is used to identify a manufacturer or vendor of a network interface. In some embodiments of the invention, the "local bit" of the OUI portion of the MAC address is set. As is known in the art, the local bit is intended to indicate that the MAC address need only be unique on network segments reachable through the network interface.

It should be noted that while a port type is desirable, alternative embodiments of the invention do not require a port type to calculate the WWPN.

Next, the calculated WWPN is assigned to the ports (block 350).

In some embodiments of the invention, after assignment of a node address, the node interface issues a "gratuitous" ARP (Address Resolution Protocol) packet (not shown). The packet is gratuitous in that it is not issued in response to an ARP request. The gratuitous ARP is desirable, because it causes other network elements in the network such as switches and routers to update their respective ARP tables more quickly than they would through normal address resolution mechanisms that rely on timeouts.

This section has described the various software methods in a system that assigns node addresses to a plurality of nodes on a network device. As those of skill in the art will appreciate, the software can be written in any of a number of programming languages known in the art, including but not limited to C/C++, Visual Basic, Smalltalk, Pascal, Ada and similar programming languages. The invention is not limited to any particular programming language for implementation.

CONCLUSION

Systems and methods for assigning node addresses for a network device are disclosed. The embodiments of the invention provide advantages over previous systems. For example, the systems and methods allow for the creation of a range of MAC addresses that can be used to uniquely identify the external and internal nodes of a network device. Although specific embodiments have been illustrated and described herein, it will be appreciated by those of ordinary skill in the art that any arrangement that is calculated to achieve the same purpose may be substituted for the specific embodiments shown. For example, the present invention has been described in the context of a storage router network device. The systems and methods of the invention apply equally as well to other types of network devices having a plurality of internal and external network interfaces. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for assigning a plurality of node addresses, the method comprising:

initiating a discovery process to discover a plurality of internal physical nodes within a computer system, the internal physical nodes supporting one or more ports, the ports of the internal physical nodes comprising a plurality of internal nodes;

receiving a base address for the computer system; and iterating over the plurality of internal nodes for the computer system, and for each node performing the acts of:

determining a node type from a plurality of node types including a first node type and a second node type, and assigning based on the node type a node address, said node address comprising a function of the base address;

wherein the node type comprises the first node type and wherein assigning a node address comprises assigning a MAC address comprised of a value arithmetically added to the base address.

2. The method of claim 1, wherein receiving a base address comprises receiving a MAC address.

3. The method of claim 1, wherein receiving a base address comprises reading the base address from a non-volatile memory of the computer system.

4. The method of claim 1, further comprising setting the local bit of the OUI portion of the MAC address.

5. The method of claim 1, further comprising issuing a gratuitous ARP packet including the node address.

6. A method for assigning a plurality of node addresses, the method comprising:

initiating a discovery process to discover a plurality of internal physical nodes within a computer system, the internal physical nodes supporting one or more ports, the ports of the internal physical nodes comprising a plurality of internal nodes;

receiving a base address for the computer system; and iterating over the plurality of internal nodes for the computer system, and for each node performing the acts of:

determining a node type from a plurality of node types including a first node type and a second node type, and assigning based on the node type a node address, said node address comprising a function of the base address;

wherein the node type comprises the second node type and wherein assigning a node address comprises assigning a MAC address comprised of a value arithmetically subtracted from a maximum address.

7. The method of claim 6, wherein the maximum address is calculated according to the base address.

8. A method for assigning a plurality of node addresses, the method comprising:

initiating a discovery process to discover a plurality of internal physical nodes within a computer system, the internal physical nodes supporting one or more ports, the ports of the internal physical nodes comprising a plurality of internal nodes;

receiving a base address for the computer system; and iterating over the plurality of internal nodes for the computer system, and for each node performing the acts of:

determining a node type from a plurality of node types including a first node type and a second node type, and assigning based on the node type a node address, said node address comprising a function of the base address;

wherein assigning a node address comprises assigning a World Wide Name (WWN) comprised of the base address concatenated with a port identifier.

9. The method of claim 8, wherein the WWN is a World Wide Port Name (WWPN).

10. The method of claim 8, further comprising incrementing or decrementing the base address according to the node type.

11. A computerized system comprising:
a processor;
a memory accessible by the processor, said memory including a base address value for the computerized system and a maximum address value; and
a plurality of internal physical nodes accessible by the processor, the internal physical nodes supporting one or more ports, the one or more ports of the internal physical nodes comprising a plurality of internal nodes, each internal node having a node type;
wherein the processor is operable to:
initiate a process to discover the internal physical nodes, and
iterate over the plurality of internal nodes, and for each node performing the acts of:
determining the node type, and
assign based on the node type a node address based on the node type, said node address comprising a function of the base address value;
wherein the node type comprises a first node type and the node address comprises a MAC address comprised of a counter value arithmetically added to the base address.

12. The system of claim 11, wherein the base address comprises a MAC address.

13. The system of claim 11, wherein the base address is stored in a non-volatile memory.

14. The system of claim 13, wherein the non-volatile memory includes memory selected from the group consisting of flash memory, hard disk memory, CD-ROM memory, DVD-ROM memory, CMOS memory.

15. The system of claim 11, further wherein the local bit of the OUI portion of the MAC address is set.

16. The system of claim 11, further wherein the processor is operable to issue a gratuitous ARP packet including the node address after assigning the node address.

17. A computerized system comprising:
a processor;
a memory accessible by the processor, said memory including a base address value for the computerized system and a maximum address value; and
a plurality of internal physical nodes accessible by the processor, the internal physical nodes supporting one or more ports, the one or more ports of the internal physical nodes comprising a plurality of internal nodes, each internal node having a node type;
wherein the processor is operable to:
initiate a process to discover the internal physical nodes, and
iterate over the plurality of internal nodes, and for each node performing the acts of:
determining the node type, and
assign based on the node type a node address based on the node type, said node address comprising a function of the base address value;
wherein the node type comprises a second node type and the node address comprises a MAC address comprised of a counter value arithmetically subtracted from the maximum address.

18. The system of claim 17, wherein the maximum address is calculated according to the base address.

19. A computerized system comprising:
a processor;
a memory accessible by the processor, said memory including a base address value for the computerized system and a maximum address value; and
a plurality of internal physical nodes accessible by the processor, the internal physical nodes supporting one or more ports, the one or more ports of the internal physical nodes comprising a plurality of internal nodes, each internal node having a node type;
wherein the processor is operable to:
initiate a process to discover the internal physical nodes, and
iterate over the plurality of internal nodes, and for each node performing the acts of:
determining the node type, and
assign based on the node type a node address based on the node type, said node address comprising a function of the base address value;
wherein the node address comprises a World Wide Name (WWN) comprised of the base address concatenated with a port identifier.

20. The system of claim 19, wherein the WWN is a World Wide Port Name (WWPN).

21. A computer storage medium having computer executable instructions for performing a method for assigning a plurality of node addresses, the method comprising:
initiating a discovery process to discover a plurality of internal physical nodes within a computer system, the internal physical nodes supporting one or more ports, the ports of the internal physical nodes comprising a plurality of internal nodes;
receiving a base address for the computer system; and
iterating over the plurality of internal nodes for the computer system, and for each node performing the acts of:
determining a node type from a plurality of node types including a first node type and a second node type, and
assigning based on the node type a node address, said node address comprising a function of the base address;
wherein the node type comprises the first node type and wherein assigning a node address comprises assigning a MAC address comprised of a value arithmetically added to the base address.

22. The computer storage medium of claim 21, wherein receiving a base address comprises receiving a MAC address.

23. The computer storage medium of claim 21, wherein receiving a base address comprises reading the base address from a non-volatile memory of the computer system.

24. The computer storage medium of claim 21, further comprising setting the local bit of the OUI portion of the MAC address.

25. The computer storage medium of claim 21, further comprising issuing a gratuitous ARP packet including the node address.

26. A computer storage medium having computer executable instructions for performing a method for assigning a plurality of node addresses, the method comprising:
initiating a discovery process to discover a plurality of internal physical nodes within a computer system, the internal physical nodes supporting one or more ports, the ports of the internal physical nodes comprising a plurality of internal nodes;
receiving a base address for the computer system; and iterating over the plurality of internal nodes for the computer system, and for each node performing the acts of:
determining a node type from a plurality of node types including a first node type and a second node type, and
assigning based on the node type a node address, said node address comprising a function of the base address;
wherein the node type comprises the second node type and wherein assigning a node address comprises assigning a MAC address comprised of a value arithmetically subtracted from a maximum address.

27. The computer storage medium of claim 26, wherein the maximum address is calculated according to the base address.

28. A computer storage medium having computer executable instructions for performing a method for assigning a plurality of node addresses, the method comprising:
initiating a discovery process to discover a plurality of internal physical nodes within a computer system, the internal physical nodes supporting one or more ports, the ports of the internal physical nodes comprising a plurality of internal nodes;
receiving a base address for the computer system; and
iterating over the plurality of internal nodes for the computer system, and for each node performing the acts of:
determining a node type from a plurality of node types including a first node type and a second node type, and
assigning based on the node type a node address, said node address comprising a function of the base address;
wherein assigning a node address comprises assigning a World Wide Name (WWN) comprised of the base address concatenated with a port identifier.

29. The computer storage medium of claim 28, wherein the WWN is a World Wide Port Name (WWPN).

30. The computer storage medium of claim 28, further comprising incrementing or decrementing the base address according to the node type.

* * * * *